(12) United States Patent
Lunde

(10) Patent No.: US 8,132,945 B2
(45) Date of Patent: Mar. 13, 2012

(54) LIGHTED BICYCLE PEDAL

(76) Inventor: Doug Lunde, Oconomowoc, WI (US)

(*) Notice: Subject to any disclaimer, the term of this patent is extended or adjusted under 35 U.S.C. 154(b) by 439 days.

(21) Appl. No.: 12/496,010

(22) Filed: Jul. 1, 2009

(65) Prior Publication Data

US 2009/0268479 A1 Oct. 29, 2009

Related U.S. Application Data (63) Continuation-in-part of application No. 11/869,455, filed on Oct. 9, 2007, now Pat. No. 7,687,943.

(51) Int. Cl.
*F21V 33/00* (2006.01)
(52) U.S. Cl. .......... 362/473; 362/192; 362/183
(58) Field of Classification Search .......... 362/473, 362/192, 183, 800
See application file for complete search history.

(56) References Cited

U.S. PATENT DOCUMENTS

| | | | |
|---|---|---|---|
| 3,764,976 A | 10/1973 | MacMahon | |
| 4,827,163 A * | 5/1989 | Bhate et al. | 310/15 |
| 5,018,392 A * | 5/1991 | Mercat | 73/862.191 |
| 5,662,405 A | 9/1997 | Kuo | |
| 5,702,172 A | 12/1997 | Kilburn | |
| 5,902,038 A | 5/1999 | Curry | |
| 6,104,096 A * | 8/2000 | Hicks | 290/1 R |
| 6,418,041 B1 | 7/2002 | Kitamura | |
| 6,550,945 B2 | 4/2003 | Chiu | |
| 6,703,716 B2 | 3/2004 | Chiu | |
| 6,849,960 B2 * | 2/2005 | Hartman et al. | 290/1 C |
| 6,914,351 B2 * | 7/2005 | Chertok | 310/12.26 |
| 7,049,708 B2 * | 5/2006 | Hartman et al. | 290/1 A |
| 7,628,518 B2 * | 12/2009 | Fujii et al. | 362/476 |
| 2005/0028639 A1 | 2/2005 | Chang | |
| 2009/0201688 A1 * | 8/2009 | Liao | 362/473 |
| 2009/0268479 A1 * | 10/2009 | Lunde | 362/473 |

* cited by examiner

*Primary Examiner* — Ali Alavi
(74) *Attorney, Agent, or Firm* — Absolute Technology Law Group, LLC (57) ABSTRACT

The present invention is an apparatus and method for illuminating a bicycle crank. A magnetic coil is coiled around a portion of a tubular structure which houses a magnetic component. The magnetic component moves slidably inside the tubular structure passing through the magnetic coil. The tubular structure is housed in an outer housing which encases a bicycle crank or fits within a specially designed bicycle crank. When the bicycle crank rotates, the magnet slides back and forth through the magnetic coil generating an electric current that is used to power an LED.

22 Claims, 9 Drawing Sheets

LIGHTED BICYCLE PEDAL

CROSS-REFERENCE TO RELATED APPLICATIONS

This application is a continuation-in-part application which claims priority to U.S. Non-provisional application Ser. No. 11/869,455 filed on Oct. 9, 2007 now U.S. Pat. No. 7,687,943.

FIELD OF INVENTION

The present invention relates to the field of bicycle safety equipment, and in particular to an apparatus for illuminating a bicycle crank and/or pedal.

GLOSSARY

As used herein, the term "light-emitting diode" or "LED" means an electronic light source.

As used herein, the term "bumper component" means any object or construction that slows down, accelerates or stops an object from maintaining its position within the tubular housing. Examples of bumper components include flexible tubes, levers, springs (including star springs with a memory, sponges and geo springs), fluid pressure, pressure-sensitive devices, electronic devices adapted to receive pressure input, one or more magnets, and combinations thereof.

As used herein, the term "magnet" or "magnetic component" means any material or object that produces a magnetic field, either natural or induced. Examples include, but are not limited to anisotropic sintered ceramic containing neodymium and boron (NdB) or neodymium, iron and boron (NdFeB), a samarium-cobalt (SmCo) magnet, an aluminum nickel cobalt alloy (AlNiCo) magnet, a ceramic magnet, flexible magnets, magnet assemblies, or any other magnet capable of generating a magnetic field.

As used herein, the term "bicycle crank" means an arm component of a bicycle which changes reciprocating motion into rotational motion used to drive the chain of the bicycle which in turn drives the rear wheel. The bicycle crank is connected to the bicycle pedal and can vary in length to accommodate different sized riders. A bicycle crank may be constructed of an aluminum alloy, titanium, carbon fiber, steel or any other suitable material.

As used herein, the term "crank pedal" means a pedal which operates a crank only.

As used herein, the term "crank" is a component of a bicycle wheel which turns a gear to drive a rear wheel, and which is generally made of non-magnetic material or which is shielded to counter magnetic effect.

As used herein, the term "gear drive pedal" means a pedal on a bicycle which operates the rear wheel of a bicycle by exerting pressure on the crank, spider and gears of the bicycle.

As used herein, the term "spider" means a component of a bicycle wheel which is an integrally molded or a separate component that connects a bicycle chain to the rear wheel axle of a bicycle.

As used herein, the term "rectifier" means an electrical device that converts alternating current to direct current.

BACKGROUND

Bicyclists are often required to train or commute in the dark. Because bicycles are less visible than cars, this presents a hazard. Risk of being hit by a motor vehicle or another rider is a problem known in the art.

In addition to the reflectors on their bicycles, bicyclists often wear reflective clothing or add reflective tape to their bicycles and/or helmets. Reflectors, reflective clothing and reflective tape; however, are only visible when a car's headlights or another light source is shining on the reflective material. By the time a driver notices a bicyclist, it may be too late for the driver to avoid a collision.

There are battery-operated pedals and headlights on the market. However, batteries must continually be charged or changed and the device must be turned on or off to conserve battery power. Battery-powered devices thus are not reliable. Other devices which generate light in an alternative manner are generally not bright and may provide intermittent illumination.

There are many types of safety lighting devices known in the art and commonly used by bicyclists, and in particular, devices incorporated into bicycle pedals.

One example of a safety lighting device for bicycles known in the prior art is taught by U.S. Pat. No. 5,702,172 (Kilburn '172). Kilburn '172 incorporates LED technology and electrical components into bicycle pedals creating rapidly flashing lights on a bicycle pedal without utilizing mechanics. It is desirable to incorporate LED technology into one or more parts of a bicycle without the need for one or more electrical components and/or batteries.

U.S. Pat. No. 5,902,038 (Curry '038) discloses another example of a lighted bicycle pedal. Curry '038 discloses a lighted bicycle pedal which has a hub and a pair of space-apart threads disposed on either side of the hub. A light source is mounted on the pedal frame and includes a light emitter to flash on and off, and a time-out mechanism. Also included are a gravity activated switch, which activates LEDs when pedals rotate to a given position, and a power supply (e.g., AA batteries). It is desirable to have an apparatus which illuminates a bicycle pedal which begins operating when the bicycle is placed in motion; however, it is further desirable not to require batteries.

U.S. Pat. No. 6,703,716 (Chiu '716) discloses a light for a bicycle which is not battery powered. Chiu '716 discloses a generator for a bicycle which includes a rotor which abuts the wheel of the bicycle. A coil is mounted in the rotor and electrically connected to two bearings that are mounted on the opposite sides of the rotor by two inner wires. A stator has a shaft extending through the two bearings and a permanent magnet sleeved into the shaft and corresponding to the coil.

Two metal rings are respectively sleeved onto opposite ends of the shaft and electrically connected to the bearings. A light is mounted on the bicycle and electrically connected to the metal rings via outer wires. The coil rotates with the rotor relative to the stator when the bicycle is moving generating electricity that is transmitted to the light. It is desirable to have a self-generating mechanism to power an LED which does not require the use of external wires or extensive altering of existing bicycle components to include internal wiring.

U.S. Pat. No. 6,104,096 (Hicks '096) discloses a generator mounted within the tread portion of a bicycle pedal. Power is generated as two meshing gear wheels of unequal diameters are rotated within a gearbox as the bicycle is pedaled. The small generator is designed to provide a sufficient output voltage to illuminate an array of LEDs and charge a capacitor which will keep the LEDs illuminated while the pedals are temporarily stationary. It is desirable to have an apparatus which illuminates a bicycle pedal which has few mechanical components and adds minimal bulk/weight to the bicycle pedal. It if further desirable to have an apparatus that illuminates a bicycle pedal which does not require the purchase of pedals, but rather can be fitted to existing pedals.

U.S. Pat. No. 6,418,041 (Kitamura '041) discloses circuitry designed to harness AC power generated by an unspecified generator, convert the AC to DC, and then supply that electricity to one or more electrical bicycling accessories. The bicycle power supply circuit taught by Kitamura '041 requires the use of multiple terminals, a full-wave voltage rectifier circuit, a storage device, a voltage regulator, a switch, and a switch control circuit. It is desirable to have an apparatus that illuminates a bicycle pedal which is capable of utilizing the energy in the form which it is generated.

SUMMARY OF THE INVENTION

The present invention is an apparatus and method for illuminating a bicyclist from the front and the rear which continuously generates power from the motion of the pedal. Various embodiments of the invention may be mounted on or within the bicycle crank, on the bicycle spokes, gears and spiders or any other component of a bicycle wheel. Excess power from the system and method described herein may be used to power auxiliary devices located on another component of the bicycle.

A magnetic coil is coiled around a portion of a tubular structure which houses a magnetic component. The magnetic component moves slidably inside the tubular structure passing through the magnetic coil. The tubular structure is housed in an outer housing which encases a bicycle crank or fits within a specially designed bicycle crank. When the bicycle crank rotates, the magnet slides back and forth through the magnetic coil generating an electric current which is used to power an LED.

DETAILED DESCRIPTION OF INVENTION

For the purpose of promoting an understanding of the present invention, references are made in the text to exemplary embodiments of a lighted bicycle pedal, only some of which are described herein. It should be understood that no limitations on the scope of the invention are intended by describing these exemplary embodiments. One of ordinary skill in the art will readily appreciate that alternate but functionally equivalent components, materials, and mechanisms may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

Figure 1:
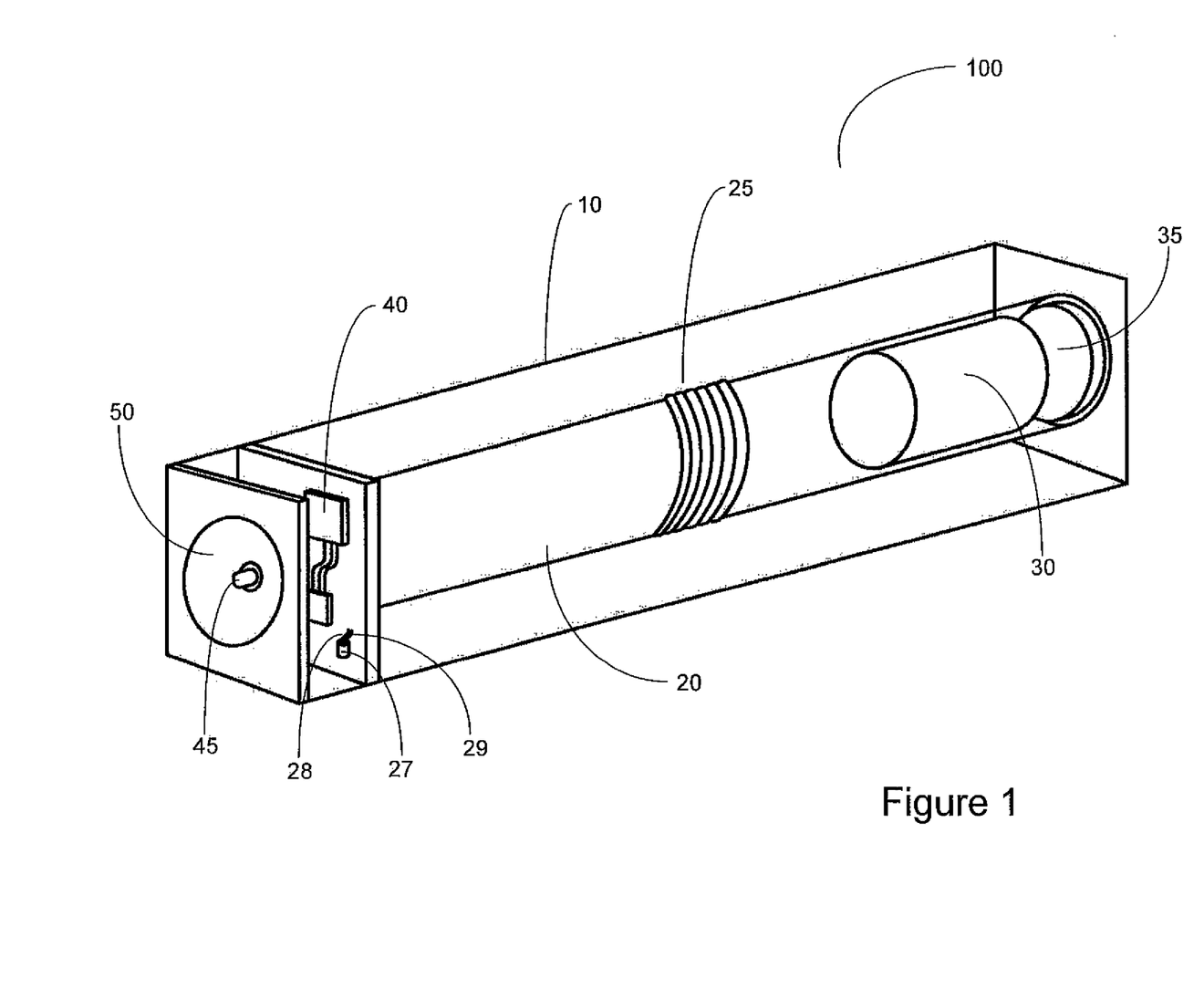
FIG. 1 shows a side view of tubular housing and tube for illuminating a bicycle crank.

FIG. 1 shows a side view of outer tubular housing 10 of apparatus for illuminating a bicycle crank 100. Outer tubular housing 10 encases inner tubular structure 20. In the embodiment shown, outer tubular housing 10 is square and inner tubular structure 20 is round. In other embodiments, inner tubular structure 20 is of any shape which can accommodate the components of apparatus for illuminating a bicycle crank 100 (e.g., square, rectangular). Outer tubular housing 10 may be of any shape which accommodates inner tubular structure 20 and which can be attached to or fit within bicycle crank 60.

In various embodiments, apparatus for illuminating a bicycle crank 100 may include capacitor 27 located within tubular housing and capacitor wires 28 and 29 which are connected to circuit board 40. Capacitor 27 may be any capacitor known in the art which can more efficiently store power and maintain illumination when a rider is gliding (not pedaling) or not moving. In the embodiment shown, circuit board 40 includes a rectifier. In various embodiments of the invention, circuit board 40 may include on-off switches and otherwise direct power to the capacitor 27 and LED 45, and may connect charging wires to any other component(s) of an apparatus for illuminating a bicycle crank 100.

Visible in outer tubular housing 10 is inner tubular structure 20. Both outer tubular housing 10 and inner tubular structure 20 are made of non-magnetic material such as plastic, aluminum, carbon composites and wood.

Located inside inner tubular structure 20 are magnet 30, and bumper component 35. Coil 25 is wrapped around a segment of inner tubular structure 20. In other embodiments, coil 25 may be located inside inner tubular structure 20 or may surround another component. In the embodiment shown, coil 25 is copper coil and magnet 30 is comprised of neodymium and is of a shape similar to that of inner tubular structure 20. In other embodiments, coil 25 may be another material which is capable of generating an electrical current. In the embodiment shown, bumper component 35 is comprised of rubber. In other embodiments, bumper component 35 is an opposing magnetic or any other material capable of slowing down and/or stopping magnet 30 so that it can fall in the opposite direction as bicycle crank 60 rotates. In the embodiment shown, the crank pedal and gear pedal may be positioned in various manners to allow illumination of a bicycle rider from the front, back or side.

Outer tubular housing 10 further includes circuit board 40. Connected to circuit board 40 is LED 45. In the embodiment shown, surrounding LED 45 is reflector 50 which reflects the light from LED 45 allowing for greater visibility. In other embodiments, more or fewer reflectors and/or magnifiers are used and may be of another shape or located in another position. In other embodiments, apparatus for illuminating a bicycle crank 100 further includes one or more capacitors and/or a switch to power LED on/off.

Figure 2:
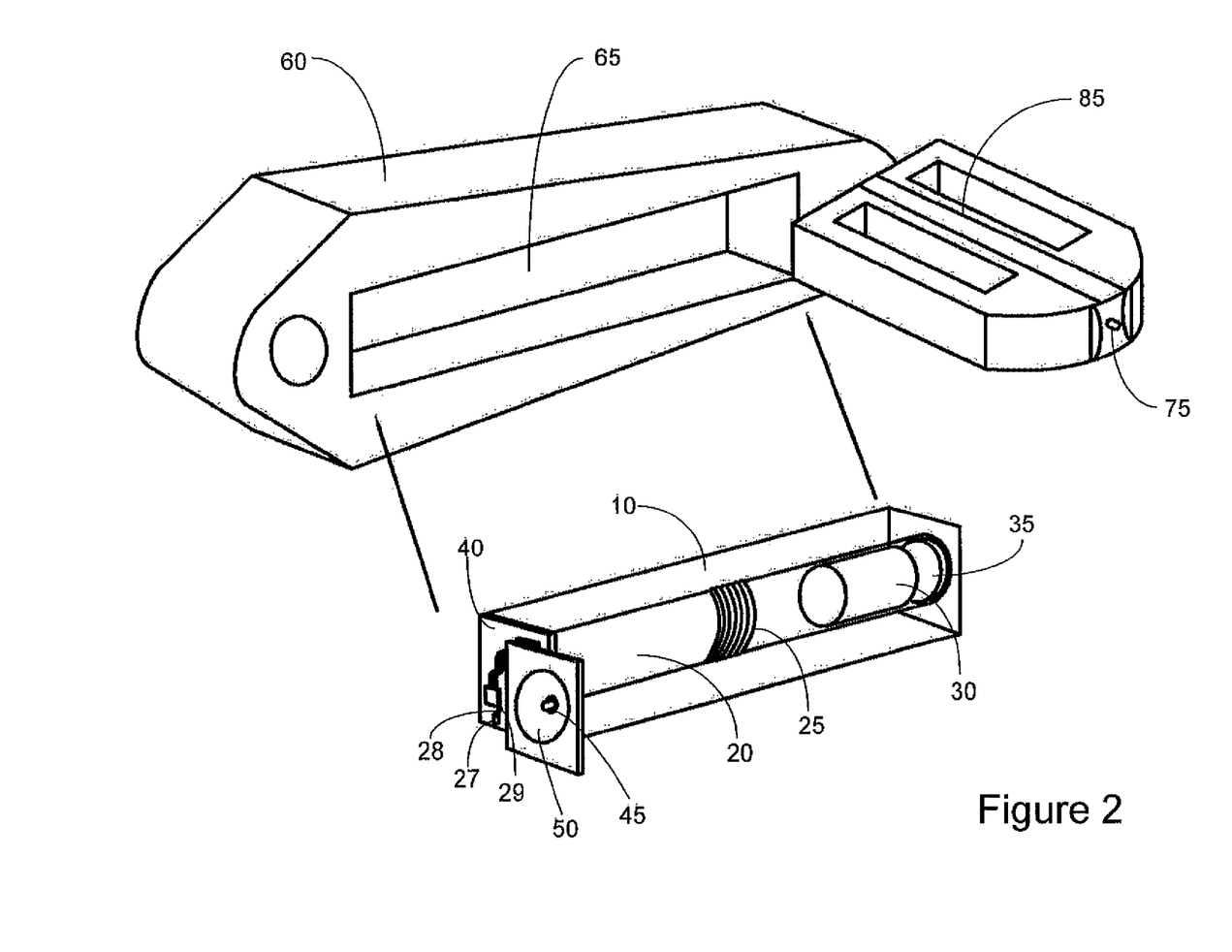
FIG. 2 shows a side view of an exemplary embodiment of an apparatus for illuminating a bicycle crank and pedal.

FIG. 2 shows an exemplary embodiment of an apparatus for illuminating bicycle crank 100 and pedal 70. In the embodiment shown, outer tubular housing 10 fits inside mounting orifice 65 of bicycle crank 60. Pedal 70 is attached to bicycle crank 60. When a bicyclist pedals, bicycle crank 60 rotates. The rotation causes magnet 30 to travel through coil 25, i.e., when the end of outer tubular housing 10 having LED 45 is facing downward, magnet 30 falls along the length of inner tubular structure 20 toward circuit board 40. As magnet 30 falls toward circuit board 40, it passes through coil 25. Magnet 30 continues to move inside inner tubular structure 20 passing through coil 25 as bicycle crank 60 rotates, i.e., when the end of outer tubular housing 10 having LED 45 is facing upward, magnet 30 falls along the length of the inner tubular structure 20 toward bumper component 35. As magnet 30 passes through coil 25, electricity is generated. The resulting electrical current passes through circuit board 40 with rectifier and is then used to power LED 45.

In the embodiment shown, LED 45 and reflector 50 extend past the surface of bicycle crank 60 which allows LED 45 to be visible. In other embodiments, outer tubular housing 10 does not have LED 45 and the electric current generated by the passing of magnet 30 through coil 25 is used to power an LED in another location (e.g., on the pedal).

In the embodiment shown, coil 25 is a copper coil, magnet 30 is comprised of neodymium, and bumper component 35 is comprised of rubber.

In the embodiment shown, bicycle crank 60 is comprised of carbon fiber with a fiberglass interior so that outer tubular housing 10 is separated from the carbon fiber by a layer of fiberglass. In other embodiments, bicycle crank 60 is made of another material or combination of materials which are strong enough to withstand pedaling and crashing and that will not corrode inner tubular structure 20 or an aluminum bicycle crank.

Also visible in FIG. 2 is second LED 75 and reflector 80 located on the end of pedal 70. Power wire 85 extends through bicycle crank 60 (power wire not visible) and though the shaft of pedal 70 connecting circuit board 40 to second LED 75. In other embodiments, one or more LEDs are located in a position other than on outer tubular housing 10 or pedal 70. In the embodiment shown, LED 75 is rounded and protrudes from the surface of the bicycle crank, but may be of alternate shapes and sizes in other embodiments. Other embodiments may include multiple LED components. For example, one embodiment includes a "rope light" known in the art which supports multiple LED components.

Figure 3:
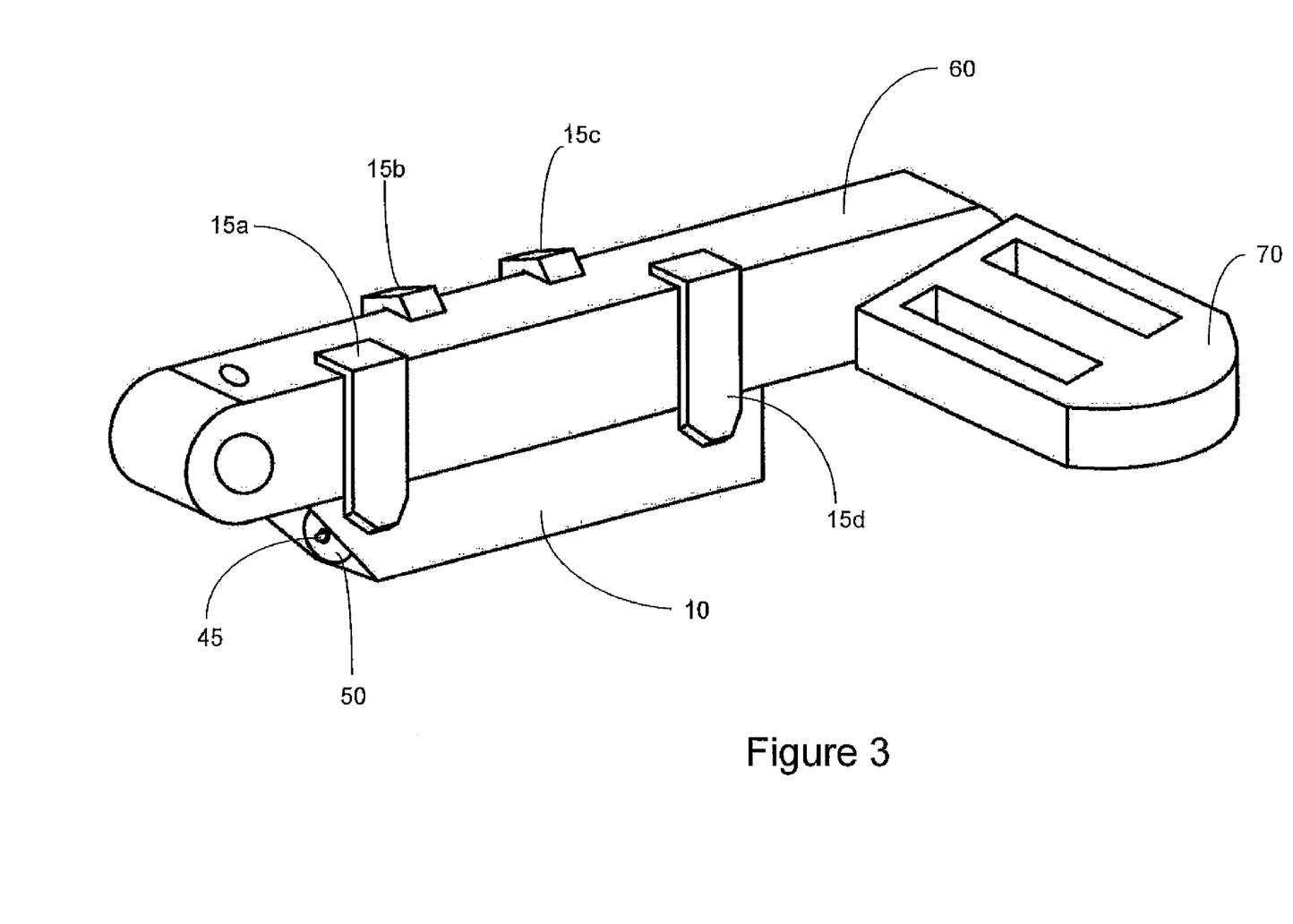
FIG. 3 shows a side view of an exemplary embodiment of an apparatus for illuminating a bicycle crank.

FIG. 3 shows an exemplary embodiment of an apparatus for illuminating bicycle crank 50. In the embodiment shown, outer tubular housing 10 is attached to bicycle crank 50. Outer tubular housing 10 is secured to bicycle crank 50 by clamps 15a, 15b, 15c, 15d. In other embodiments, outer tubular housing 10 is secured to bicycle crank 50 by a means other than clamps, such as magnets, snaps or any other structural configuration.

In other embodiments, apparatus for illuminating a bicycle crank 100 is attached to a location other than the bicycle crank, such as the gear, a wheel spoke(s), a pedal, the spider and/or any other location on the bicycle. In addition to LED 45, apparatus for illuminating a bicycle crank 100 may be used to power an LED in addition to LED 45 when placed on the gear, a wheel spoke(s), a pedal, the spider or any other location. For example, apparatus for illuminating a bicycle crank 100 may be secured to a wheel spoke and power one or more LEDs located on bicycle pedal 70.

Figure 4:
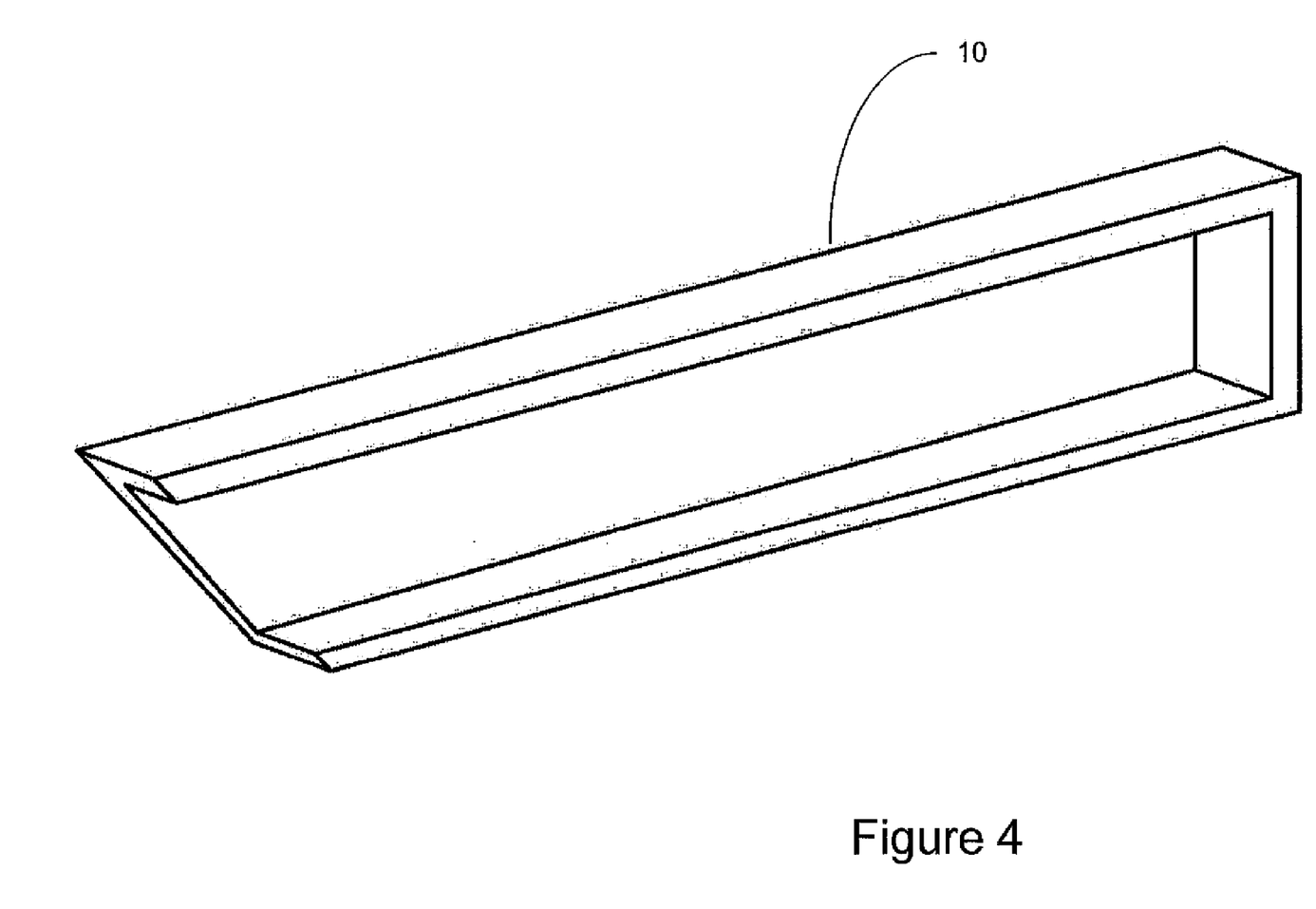
FIG. 4 shows a side view of one embodiment of a tubular housing.

FIG. 4 shows a side view of one embodiment of outer tubular housing 10. In the embodiment shown, outer tubular housing 10 is comprised of carbon-fiber. In other embodiments, tubular housing is comprised of aluminum, plastic resin, epoxy, fiberglass, or any material capable of withstanding crashing.

Figure 5:
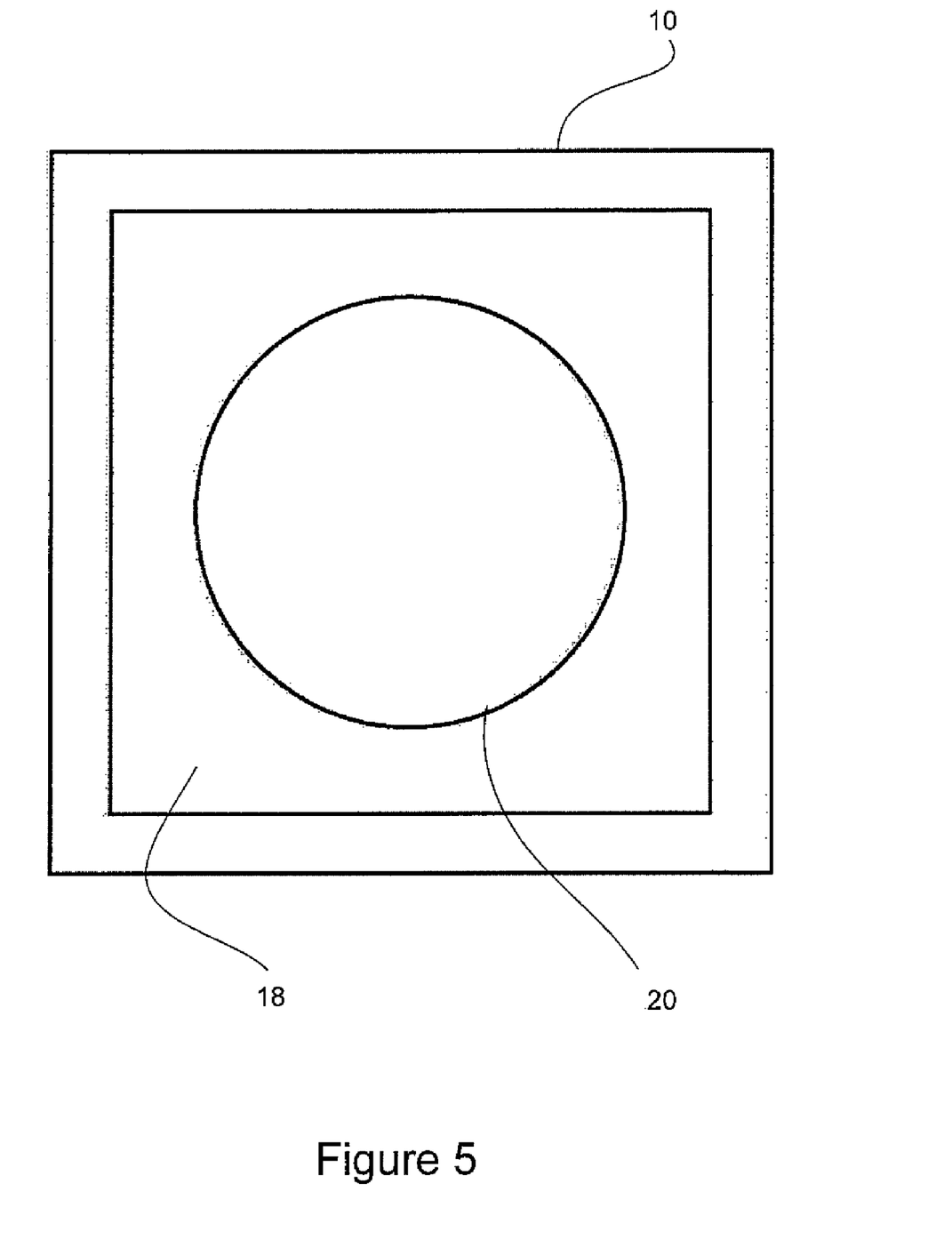
FIG. 5 shows a sectional view of one embodiment of a tubular housing.

FIG. 5 illustrates a sectional view of one embodiment of inner tubular structure 20 encased in outer tubular housing 10. In the embodiment shown, inner tubular structure 20 is comprised of aluminum and outer tubular housing 10 is comprised of carbon fiber. In between inner tubular structure 20 and outer tubular housing 10 is barrier material 18. In the embodiment shown, barrier material 18 is fiberglass. In other embodiments, barrier material 18 is plastic, resin, epoxy or any other material which prevents the corrosion of inner tubular structure 20.

In other embodiments, bicycle crank 50 (not shown) is comprised of aluminum, outer tubular housing 10 is comprised of carbon fiber and inner tubular structure 20 is comprised of plastic. In such embodiments, a layer of fiberglass would be placed in between bicycle crank 50 and outer tubular structure 10 to prevent corrosion of the aluminum bicycle crank.

Figure 6:
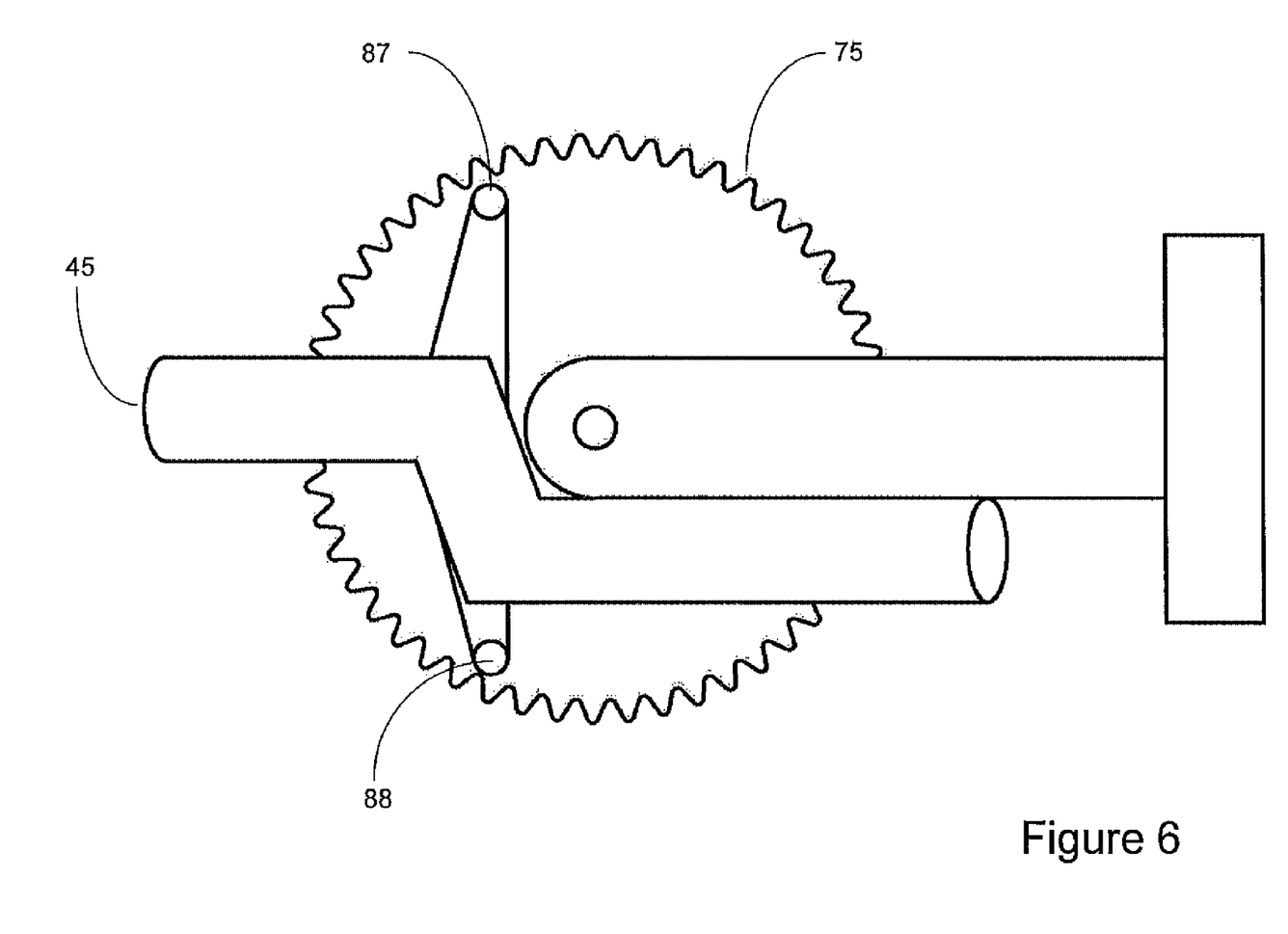
FIG. 6 shows an alternate embodiment of an apparatus for illuminating a bicycle crank.

FIG. 6 illustrates an alternate embodiment of apparatus for illuminating a bicycle crank 100 which attaches to sprocket 75 of a bicycle and which can be selectively removed and attached to sprocket 75. In the embodiment shown, apparatus for illuminating a bicycle crank 100 is attached to sprocket 75 using magnets 87, 88 or any other magnets known in the art. In the embodiment shown, magnets 87, 88 are neodymium magnets. In alternative embodiments, alternative but functionally equivalent attachment means, such as bolts or interlocking and complementary structures may be used to secure apparatus for illuminating a bicycle crank 100 to a bicycle.

In the embodiment shown, two magnets are used, but in other embodiments, more or fewer magnets, bolts or interlocking structures may be used. In still other embodiments, apparatus for illuminating a bicycle crank 100 and magnets 87, 88 may be enclosed by a housing or cover (not shown). In the embodiment shown in FIG. 6, LED 45 illuminates a rider from both the front and the rear.

Figure 7:
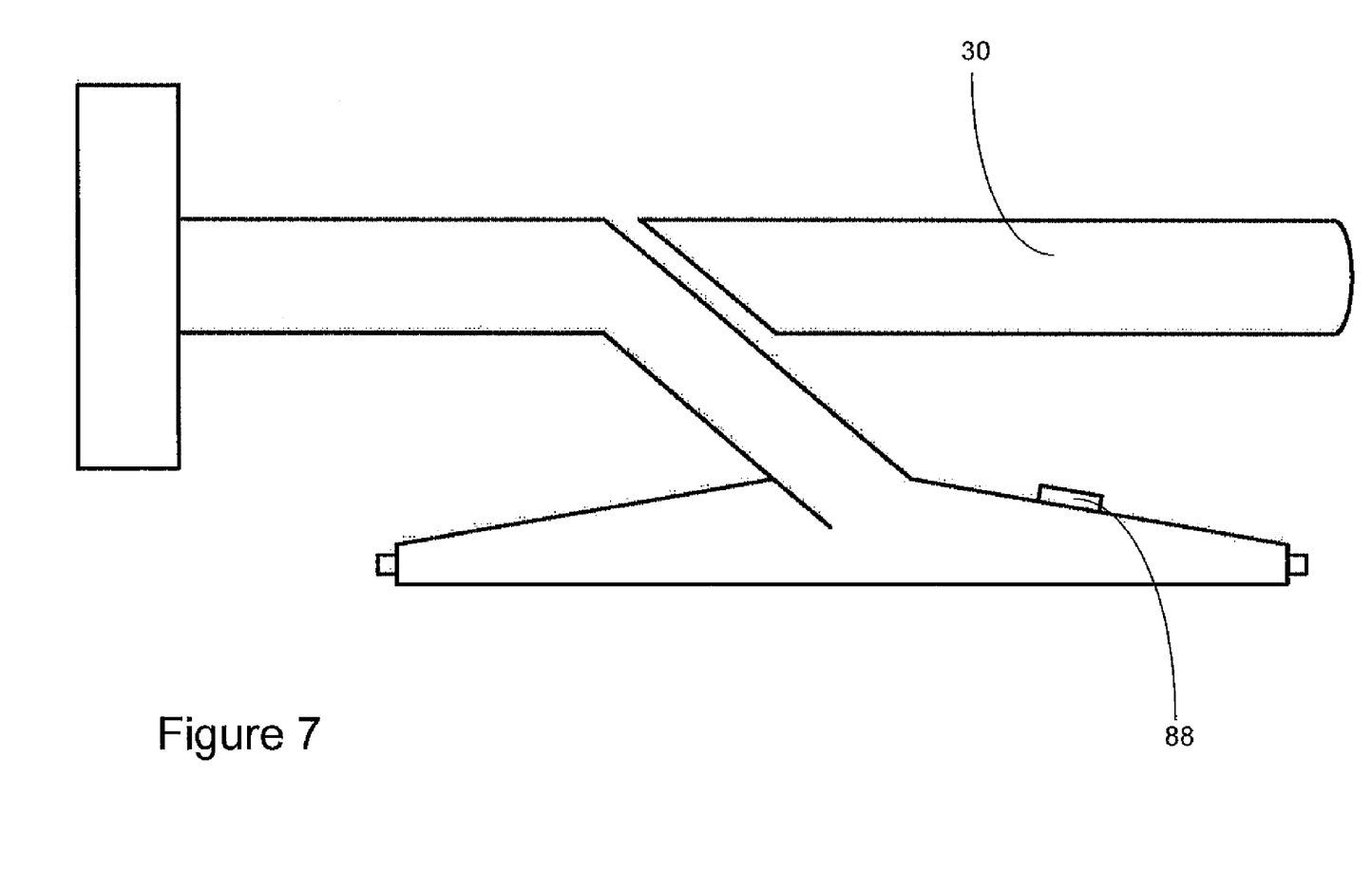
FIG. 7 shows a side view of a magnet-mounted apparatus for illuminating a bicycle crank.

FIG. 7 illustrates a side view of a magnet-mounted apparatus for illuminating a bicycle crank 100, which requires sufficient space between sprocket 75 and magnets 87, 88 to prevent external mounting magnets 87, 88 from being attracted to internal magnet 30.

Figure 8:
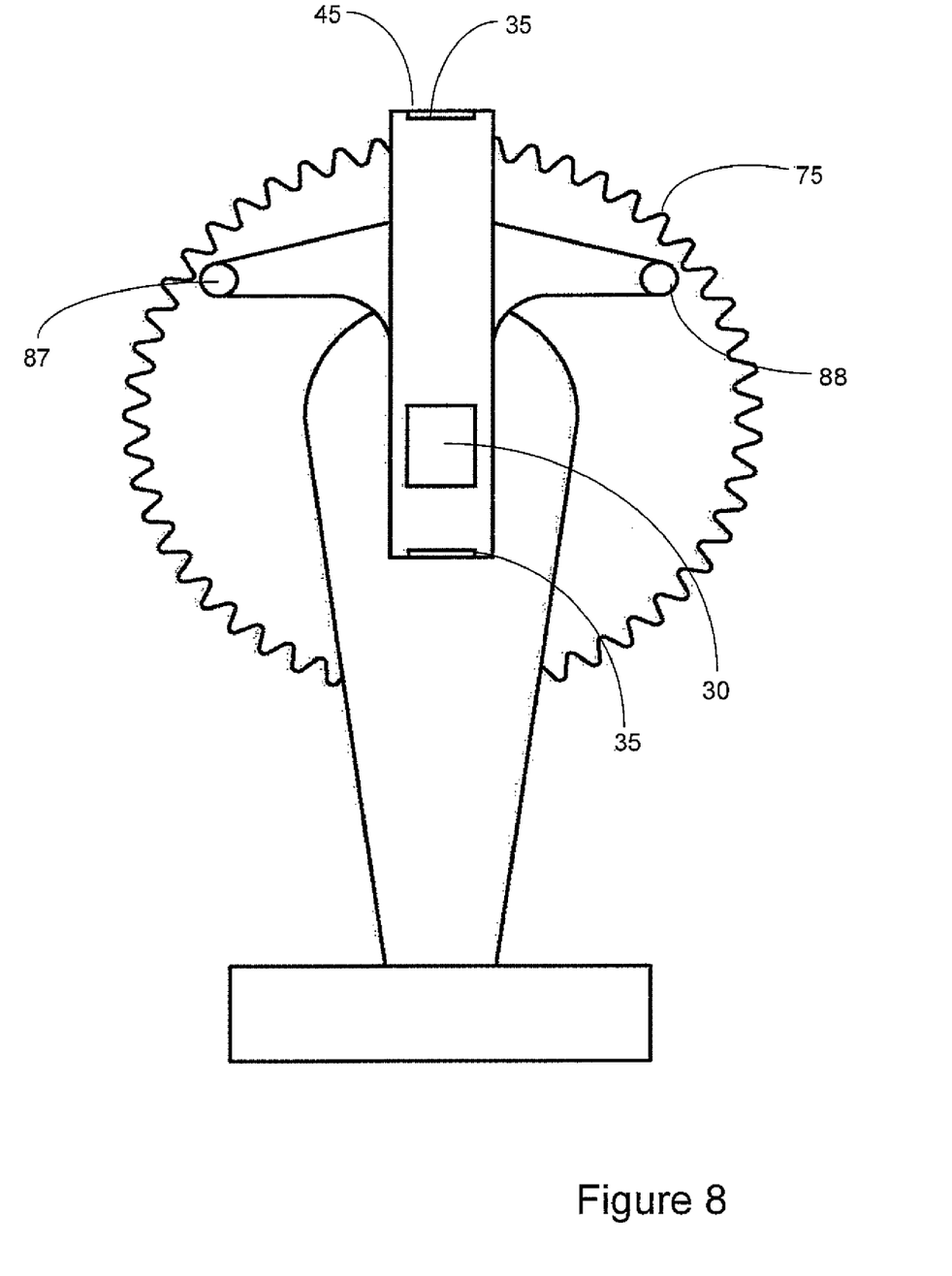
FIG. 8 shows an alternate embodiment of an apparatus for illuminating a bicycle crank.

FIG. 8 illustrates an alternate embodiment of apparatus for illuminating a bicycle crank 100. In the embodiment shown, LED 45 flashes in one direction.

Figure 9:
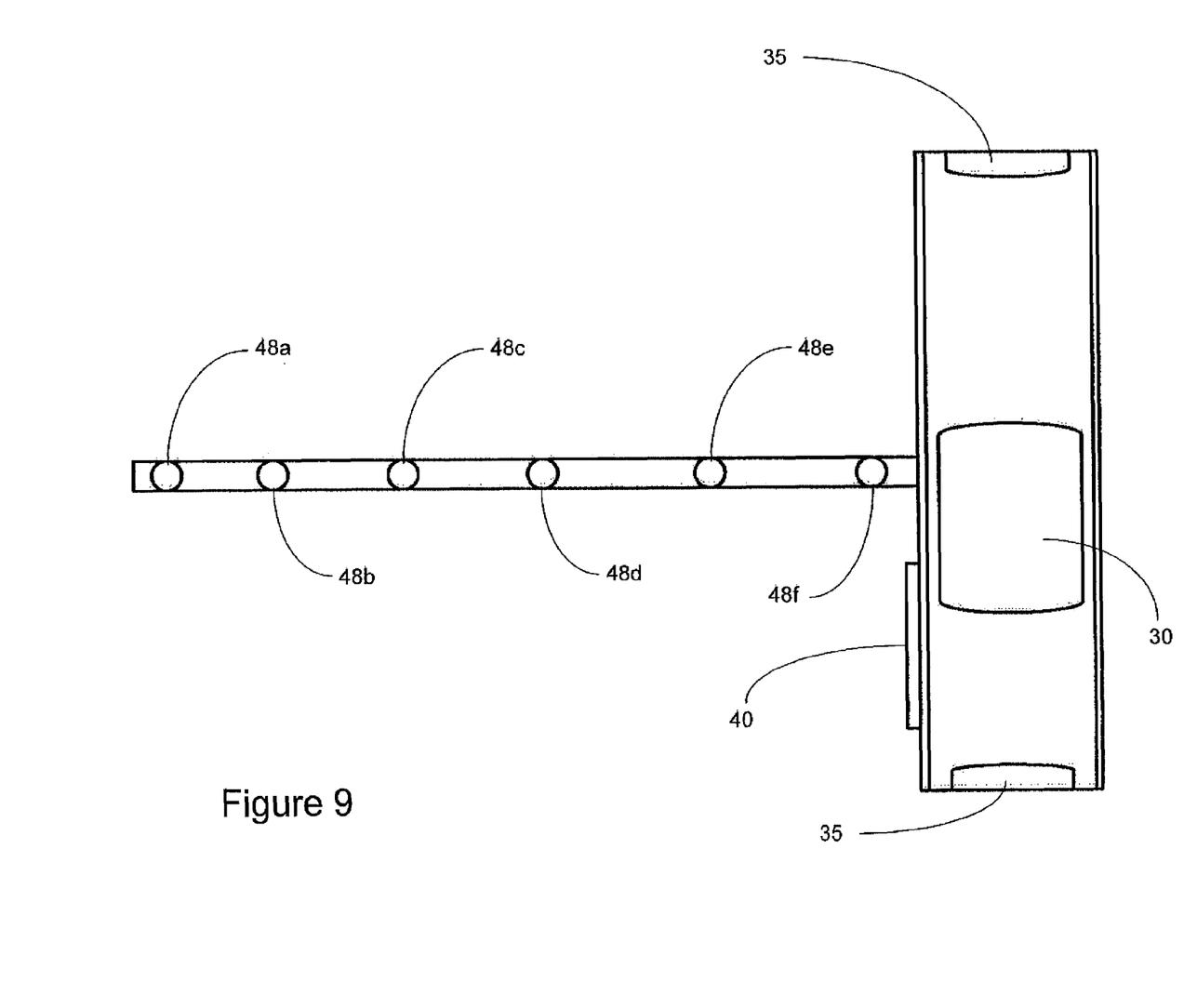
FIG. 9 shows an alternate embodiment of an apparatus for illuminating a bicycle crank which contains multiple LED components.

FIG. 9 illustrates an alternate embodiment of apparatus for illuminating a bicycle crank 100. In the embodiment shown, apparatus for illuminating a bicycle crank 100 includes multiple LEDs 48a, 48b, 48c, 48d, 48e, 48f configured in a "rope light" arrangement. LEDs 48a, 48b, 48c, 48d, 48e, 48f are attached to a flexible, plastic tube. In other embodiments, LEDs 48a, 48b, 48c, 48d, 48e, 48f may be configured in another arrangement and/or mounted using an alternate means of attachment.

In an exemplary embodiment, apparatus for illuminating a bicycle crank 100 is attached to a spoke of the bicycle wheel using plastic or metals clips or any other means of attachment known in the art. Apparatus for illuminating a bicycle crank 100 may be attached to a spoke on the front or rear wheel of a bicycle and a wheel may contain multiple apparatuses for illuminating a bicycle crank 100. As the wheel turns, magnet 30 passes through coil 25 (not shown) generating an electrical current. Also visible in FIG. 9 are bumper components 35 and circuit board 40.

Also included in the embodiment shown, is an opposing magnet (not shown) which is attached to the fork of the bicycle or other comparable location. The opposing magnet ensures that magnet 30 continues to pass through coil 25 (not shown) as the wheel rotates.

What is claimed is:

1. An apparatus for illuminating a bicycle crank comprised of:
    at least one outer housing which encases a bicycle crank; and
    at least one tubular structure having at least one magnetic coil and at least one magnetic component adapted to move slidably within said at least one magnetic coil to generate an electrical current.

2. The apparatus of claim 1 wherein said tubular structure is encased within a bicycle crank.

3. The apparatus of claim 1 wherein said tubular structure is positioned next to said bicycle crank and positioned within said at least one outer housing.

4. The apparatus of claim 1 wherein said bicycle crank includes an aperture for insertion of said at least one tubular structure.

5. The apparatus of claim 4 which further includes a reinforcing material within said aperture to reinforce said bicycle shaft.

6. The apparatus of claim 5 wherein said reinforcing material is selected from a group consisting of fiberglass, epoxy, carbon fiber and rubber.

7. The apparatus of claim 1 which further includes at least one LED light.

8. The apparatus of claim 7 which further includes at least one reflective LED light housing.

9. The apparatus of claim 8 wherein said reflective LED light housing is capable of magnifying.

10. The apparatus of claim 1 which further includes at least one opposing magnet.

11. The apparatus of claim 1 which further includes at least one bumper component.

12. The apparatus of claim 1 wherein said at least one tubular structure is made of a non-magnetic material.

13. The apparatus of claim 1 wherein said bicycle crank is encased with a reinforcing layer.

14. The apparatus of claim 13 where said reinforcing layer is selected from the group consisting of fiberglass and carbon fiber.

15. The apparatus of claim 1 which further includes an optional switch.

16. A method of manufacturing an apparatus for illuminating a bicycle crank comprised of:
    encasing at least one magnetic coil within at least one tubular structure;
    inserting at least one magnet within said at least one tubular structure so that said at least one magnet can move slidably within said at least one magnetic coil.

17. The method of claim 16 which further includes the step of inserting said tubular structure within an aperture within a crank.

18. The method of claim 17 which further includes the step of filling said aperture with a reinforcing material.

19. The method of claim 17 which further includes the step of encasing said crank with a reinforcing layer.

20. A selectively attachable apparatus for illuminating a bicycle crank comprised of:
    at least one outer housing;
    at least one tubular structure which contains at least one magnetic coil and at least one magnetic component adapted to move slidably within said coil to generate an electrical current; and
    a means for securing said at least one outer housing on to a bicycle.

21. The selectively attachable apparatus of claim 20 wherein said at least one outer housing is secured to said bicycle at a location selected from a group consisting of bicycle crank, gear, wheel spoke, pedal and spider.

22. The selectively attachable apparatus of claim 20 wherein said means for securing said outer housing on said bicycle crank is selected from a group consisting of magnets, bolts, clamps, tabs, interlocking structural components, hook and eye fabric and combinations thereof.

* * * * *